F. H. MULLER.
ART OF MAKING COFFEE AND APPARATUS THEREFOR.
APPLICATION FILED JULY 29, 1916.
1,345,947.
Patented July 6, 1920.
2 SHEETS—SHEET 2.
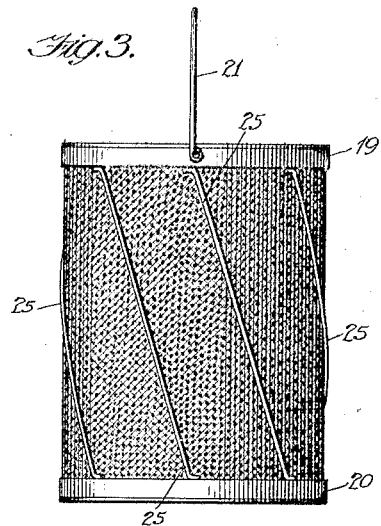
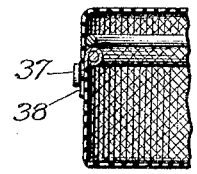
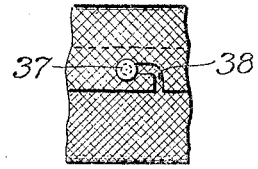
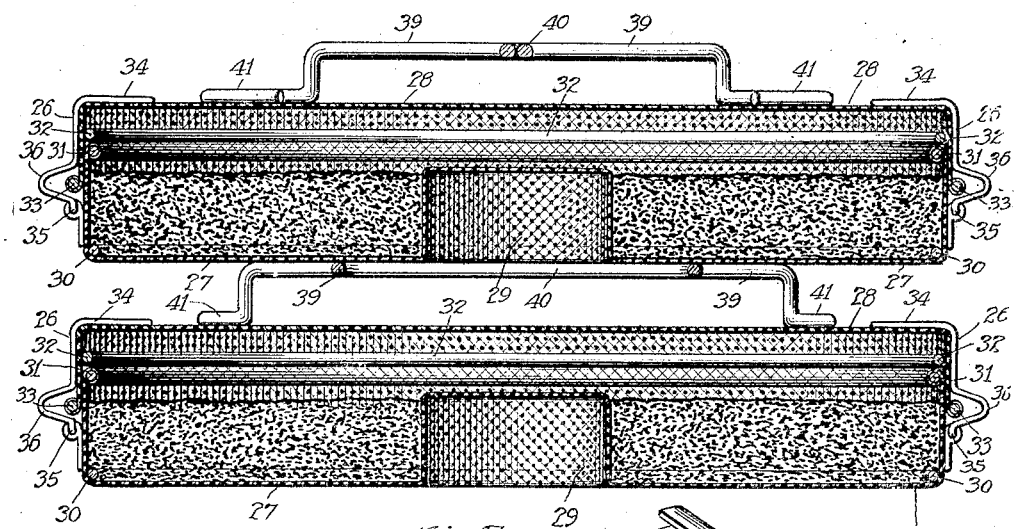
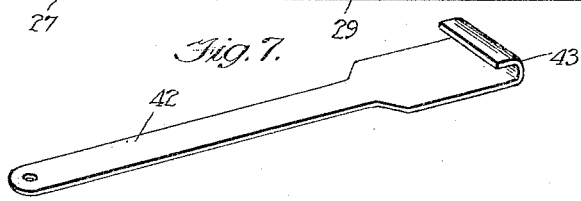
Witnesses
Martin H. Olsen.
Robert Dobberman
Inventor
Frederick H. Muller

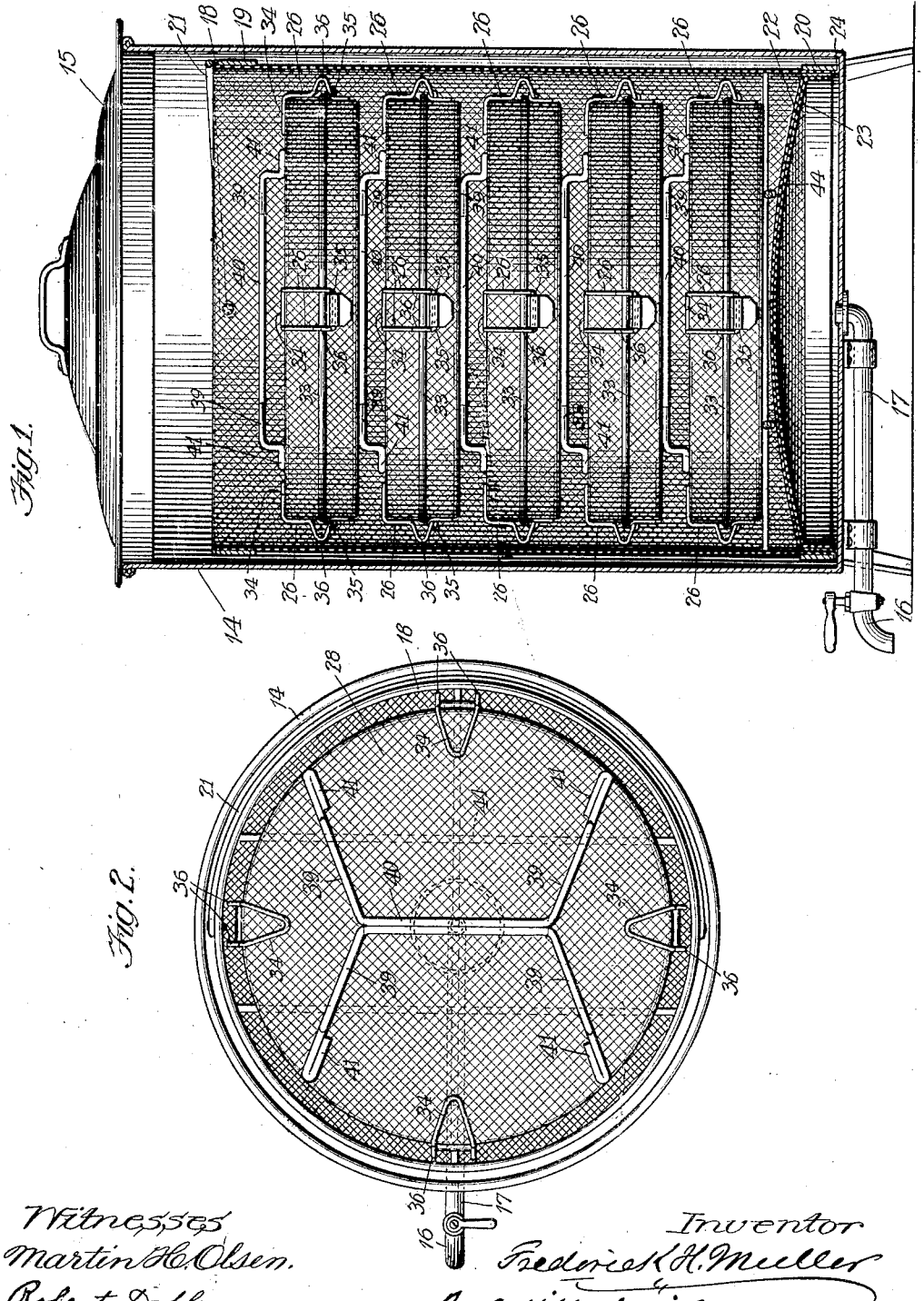

UNITED STATES PATENT OFFICE.

FREDERICK H. MULLER, OF CHICAGO, ILLINOIS.

ART OF MAKING COFFEE AND APPARATUS THEREFOR.

1,345,947.      Specification of Letters Patent.      Patented July 6, 1920.

Application filed July 29, 1916. Serial No. 112,041.

*To all whom it may concern:*

Be it known that I, FREDERICK H. MULLER, a citizen of the United States, residing at Chicago, in the county of Cook and State of Illinois, have invented certain new and useful Improvements in the Art of Making Coffee and Apparatus Therefor, of which the following is a specification.

My invention relates more particularly to supplying coffee in cafés, hotels and the like where large quantities of the beverage are consumed, and it is necessary to have a supply thereof constantly on hand for a considerable period, though in certain of its features the invention is applicable also to the production of coffee for household use. The invention is based mainly upon the discovery that when coffee, after having been heated and moistened, is exposed to the air it undergoes a change whereby the original flavor is greatly impaired, and certain deleterious substances formed in the coffee. In the coffee urns commonly used in restaurants, cafés and the like, the ground coffee is retained in a bag open at the top, which depends within the liquid receptacle. Hot water is poured over the coffee in the liquid container wetting the same and extracting the flavoring matter and fills the receptacle more or less according to the amount of beverage desired. Whether or not the liquid receptacle is originally filled to a point above the ground coffee, as the decoction is drawn off the upper part of the fabric container and of the ground coffee is exposed to the air and steam above the level of the liquid. The exposed coffee after moistening undergoes the change in flavor and composition referred to above, and moreover becomes more or less compacted, so that when the coffee decoction is again poured over the grounds, or hot water added with or without additional coffee, the resulting beverage is far inferior to the first brew, and contains material which is not only unpalatable but injurious. Moreover when the coffee is wetted in its first treatment with water and permitted to dry, the grains stick together more or less, and the second application of water does not readily penetrate the mass throughout, but is inclined to flow around the same.

A further objection to this old method of making coffee is that where the fabric bags for containing the coffee are thrown away after a single use an item of expense is added, and if on the other hand the bag is reused it is unsanitary and imparts an objectionable flavor to the beverage. My invention has for its object to obviate the above objections and difficulties, which I accomplish by so supplying and supporting the ground coffee in the coffee urn, that it is never under any circumstances subjected to the decoction or beverage after having been exposed to the air and steam following the first application of the water thereto. The coffee is supplied to the urn in one or more containers which may be superposed upon each other according to the depth to which the urn or other receptacle is filled with water. As the level of the liquid sinks with the drawing off of the decoction, which may be observed in the gage, the coffee containers are withdrawn so that there is no opportunity for the coffee therein to become dry and to be again subjected to the liquid. The coffee containers are in the nature of metal boxes which are readily cleaned for reuse and dispense entirely with textile fabric, coffee bag, and the disadvantage thereof to which reference has been made.

In the accompanying drawing I have shown and in the following specification described with particularity a number of preferred forms of my invention. It is to be understood, however, that the specific disclosure is for the purpose of exemplification only and that the scope of the invention is defined in the following claims in which I have endeavored to distinguish from the prior art so far as known to me without, however, relinquishing or abandoning any portion or feature thereof.

In the drawings Figure 1 is a vertical central section of a preferred form of my invention as applied to a coffee urn for restaurants and the like, parts being shown in elevation; Fig. 2 is a plan view thereof; Fig. 3 is a side elevation of one of the details of my invention; Fig. 4 a vertical section of certain details of the invention upon an enlarged scale; Figs. 5 and 6 details in vertical section and elevation respectively, of a modification of the device shown in Fig. 4; Fig. 7 a perspective view of a tool to be used in connection with the construction shown in Figs. 1 to 6 inclusive. Each part is identified by the same reference character wherever it occurs throughout the several views.

Referring first to the form of invention shown in Figs. 1 to 4, inclusive, the outside container 14 may be of any suitable shape or design adapted to contain the elements hereinafter referred to and in this instance is shown as a cylindrical tank having a cover 15 and a spigot 16 which is connected by a pipe 17 with the bottom of the tank 14. Within the tank 14 is fitted a bucket or cylinder 18 of sheet metal having reinforcing bands 19, 20, at the top and bottom thereof respectively, and a handle 21 for lifting said bucket. The walls and bottom of the bucket are perforated with fine holes or openings throughout to permit circulation of the beverage through said walls and the bottom 22 is concave or upwardly dished as shown and forms a seat for a second screen 23 which is also perforated through with fine holes for the passage of the liquid. The screen 23 fits snugly against the perforated bottom 22 but is readily removable therefrom. The bottom edge 24 of the bucket rests closely upon the bottom of the tank 14 so as to substantially prevent the flowing of liquid under said edge whereby all beverage reaching the outlet pipe 17 is caused to flow through the double screen 22, 23, to prevent any of the finer particles of coffee berry from being carried out with the beverage. A series of inclined brace bars 25 connect the bands 19, 20, and stiffen the bucket and prevent collapse thereof.

The ground coffee is contained within a series of closed cylindrical boxes or receptacles 26 which are each formed with a lower or bottom section 27 and a top section or cap 28. The walls of these receptacles are formed preferably throughout with fine perforations of such size as to prevent the passage of the finer grains of coffee and the bottom section is struck up near its center into a cylindrical recess 29, the walls of which are also perforated to secure a greater circulation of the hot water. The bottom section is provided with strengthening wires 30, 31, respectively. The top section is provided interiorly with an annular wire 32 which is soldered or otherwise secured thereto at a suitable distance from the head to provide a clear space above the upper edge of the bottom section, and the lower edge of said top is strengthened by a wire 33. Various means may be employed for securing the top and bottom in proper relative position, that shown in Fig. 4 consisting of a bent hook 34 which is hinged to the bottom member at 35 and bent so that when in the position shown in Fig. 4 its upper end overlies the top section and holds the same firmly in position. The hook member is crimped intermediate its ends as at 36 to escape the wire 33.

Another form of connection between the top and bottom section which may be used in place of that described is the bayonet joint shown in Figs. 5 and 6 comprising pins 37 secured to the lower section and angular slots 38 formed in the top section for interlocking therewith in a well-known manner.

The coffee receptacles are superposed one upon another in the bucket 18 to a height depending upon the proposed level of the liquid in the urn. The top of each receptacle has soldered thereto a spider 39 comprising a pair of wires bound together at the center by a sheet metal strip 40 and having feet 41 which are soldered or otherwise secured to the top of a coffee receptacle. The spider upon each container supports the container next above it, thus spacing the containers a suitable distance apart to provide for a free circulation of the fluid between and through the containers, but the lowermost container rests upon a wire frame 44 spaced a short distance above the bottom of the bucket.

In practising my invention the lower section of each container is filled to the level indicated in Fig. 4 not to exceed an inch or an inch and a quarter, and the cover secured in place thereon by the fastenings described. Each container thus constitutes in effect a cartridge containing a definite amount of coffee with room above the same for considerable movement and expansion. The number of cartridges employed for any particular making of coffee depends upon the amount to be made, so that the containers constitute a convenient means for supplying the exact quantity of coffee required. After the coffee containers are in place, the hot water is poured upon them and may be drawn off and repoured if desired until the required strength of decoction is reached. In any event the amount of liquid introduced is more than sufficient to cover the containers employed, and as the level of the liquid falls the containers are successively removed, each before it is exposed by the lowering of the level of the liquid. For this purpose I may employ the tool 42 shown in Fig. 7, the hook end 43 of which is used to grasp the central bar of the spider, by which the container may then be lifted out. Obviously to facilitate the circulation of the liquid through the containers the pocket or cylinder 18 may be raised and lowered within the urn or other coffee receptacle, or if desired the containers may be individually raised and lowered. The relative movement of the liquid and the body of coffee in the containers is facilitated by the space above the coffee which permits a free movement of the individual grains thereof. When, however, the bucket is at rest upon the bottom of the urn or tank, it closes off any flow of liquid under its lower edge, so that all liquid reaching the draw-off pipe 17 is compelled to travel through the double screen 22, 23.

If desired to use a powdered coffee or to even more completely eliminate the finer particles of solid matter from the coffee, a fibrous filter may be introduced between the screens 22 and 23, though for most purposes this is not necessary. While the bucket or cylinder constitutes a convenient and desirable part of the construction in which my invention is practised, it is not an essential thereof viewing the invention in its broader aspect, for obviously the ground coffee containers could be used directly in the coffee urn without any other support or casing.

In practising my improved process by means of the apparatus devised by me I am able to make uniform liquid coffee and maintain its condition until the liquid is entirely consumed by reason of the fact that before the liquid level reaches any container it is removed from the urn. Or if the desired strength of the concoction is obtained before the full strength of the ground coffee is utilized one or more of all of the containers may be then removed. The absorption of the flavor from the ground coffee beans may be facilitated as above pointed out by moving the receptacles up and down, and as preferably the receptacles are filled only to the depth of an inch or an inch and a quarter the coffee particles are freely floated and circulated in the container when the latter is moved. If high-grade coffee is used it may be left in the urn or coffee pot a considerable length of time depending upon the strength of coffee desired, but if an inferior grade is used it should be removed from the urn before it has been submerged so long as to unfavorably affect the taste of the brew. The containers form a very convenient means, moreover, for apportioning the proper amount of coffee to each quantity of liquid coffee made. The apparatus is simple and compact and thoroughly sanitary, not only because it prevents the formation of noxious compounds but by reason of the fact that it is easily kept thoroughly clean and does not retain any portion of a charge after the charge has been removed.

I claim:

1. A means for making coffee comprising a liquid receptacle, a perforated bucket within the receptacle, and a series of superposed successively removable, perforated coffee containers supported by said bucket above the bottom thereof, each container being provided with a cover.

2. A means for making coffee comprising a liquid receptacle, a perforated bucket within the receptacle, a removable screen adjacent the bottom of said bucket, and a series of superposed, successively removable perforated coffee containers supported in said bucket, each container having a top and means for spacing it from the adjacent container.

FREDERICK H. MULLER.